May 26, 1925.                                                                    1,539,238
C. F. BROWNE
CONTROL MEANS FOR HEADLAMPS OF ROAD VEHICLES TO OBVIATE GLARE
Filed May 23, 1924

Inventor
C. F. Browne
by Jno. Mirir
atty.

Patented May 26, 1925.

1,539,238

UNITED STATES PATENT OFFICE.

CHARLES F. BROWNE, OF CAMBERWELL, NEAR MELBOURNE, VICTORIA, AUSTRALIA.

CONTROL MEANS FOR HEADLAMPS OF ROAD VEHICLES TO OBVIATE GLARE.

Application filed May 23, 1924. Serial No. 715,426.

*To all whom it may concern:*

Be it known that I, CHARLES FOSTER BROWNE, a subject of the King of Great Britain, residing at Camberwell, near Melbourne, in the State of Victoria, Commonwealth of Australia, have invented new and useful Improved Control Means for Headlamps of Road Vehicles to Obviate Glare, of which the following is a specification.

This invention relates to improved means for regulating the luminosity of head-lamps of automobiles, motor-cycles and other road vehicles whereby the glare and dazzling effects of such lamps can be obviated or minimized under the direct control of the driver of the vehicle.

It is most desirable during night driving to have at hand means for dimming or otherwise controlling the head-lamps of an automobile when approaching another vehicle travelling in the opposite direction to obviate liability of the glare and dazzling effect of such lamps from temporarily blinding or confusing the driver of the approaching vehicle in such a manner as would prejudice his proper control of the vehicle.

According to some methods now adopted to obtain this result, the brilliancy of the head-lamps is dimmed by inserting electrical resistances into the head-lamp circuits, or by switching the head-lamps into "series" arrangement instead of "parallel" arrangement. These methods, however, have the disadvantage that the illumination of the roadway in advance of the vehicle is considerably reduced following dimming, and the driver of the automobile having the dimmed lights must materially reduce the speed of the vehicle and otherwise exercise considerable caution in order to negotiate the roadway with safety under the conditions of decreased illumination.

It is an object of this invention to provide means whereby the luminosity of head-lamps of automobiles or other vehicles can be regulated, at the will of and under the control of the driver, to obviate glare and dazzling effect, but without reducing the brilliancy of the lamps or the illumination of the roadway in advance of the vehicle.

The basic feature of the invention is deemed to reside in the provision of means whereby the globes or source of light of the head-lamps can be moved, at the will of the driver, out of focus with the parabolic reflectors to cause the concentrated portion of the beam to be deflected downwardly and illuminate the roadway at a shorter, but yet adequately effective, distance in advance of the vehicle being driven.

The invention can be carried into effect by numerous mechanical arrangements, the construction of which will vary according to the types of head-lamps to which the invention is applied. The accompanying drawings illustrate a representative form of the invention, wherein the mechanical arrangement depicted is for application of the invention to an automobile head-lamp of conventional type.

In these drawings:—

Figure 1:
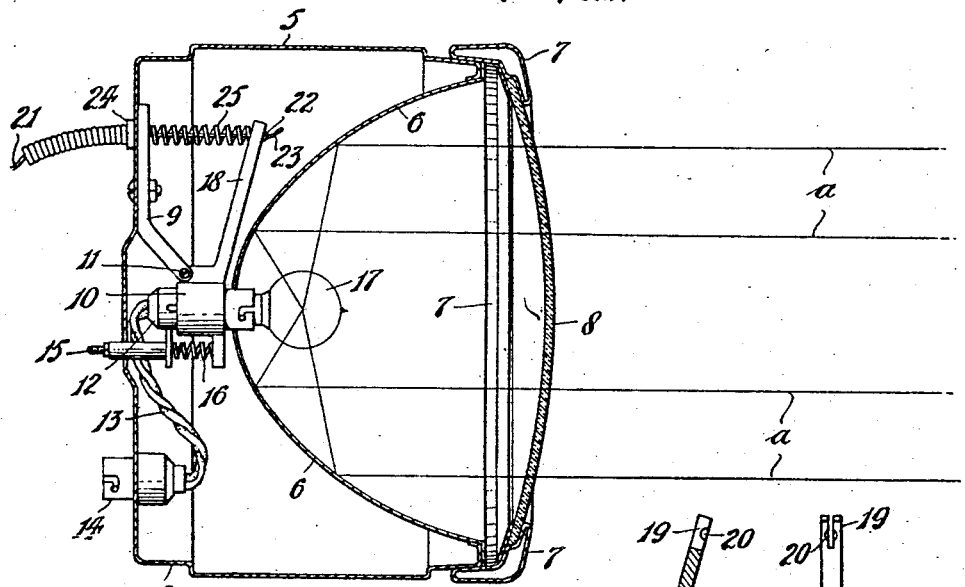
Figure 1 is a view in section, showing the globe of the head-lamp in correct focal position with the parabolic reflector for ordinary roadway illumination purposes.
Figures 3, 4:
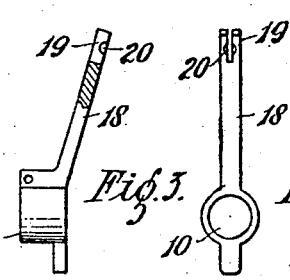
Figures 3 and 4 are detail views of the holder for the lamp socket illustrated in Figures 1 and 2.

In these views, 5 designates the metal casing of an automobile head-lamp, 6 the parabolic reflector, 7 the lens holder, and 8 the lens. Attached to the interior surface of the casing 5 rearwardly of the parabolic reflector is a bracket 9, upon which a holder 10 is pivotally mounted at 11.

Fitted in said holder 10 is a lamp-socket 12 of conventional type, which is connected in the usual way by insulated flexible wires 13 to a plug socket 14 mounted in an aperture formed in the head-lamp casing. The lamp-socket 12 is provided with the usual adjustment screw 15 and spring 16, whereby it can be conveniently adjusted, as and when required, to bring the globe 17 into correct focus relative to the parabolic reflector.

The holder 10 is provided with an upwardly extending arm 18, which has at its end a slot 19 and a small seating recess 20. An end of a "Bowden" control wire 21 is passed through said slot 19 and it has a metallic button 22, which is accommodated in said recess 20. By this form of connection between the end of the "Bowden" control wire 21 and the arm 18, the wire 21 can be quickly released by merely pulling its free end 23 to remove the metallic button 22 from the recess 20, when the wire is slipped through said slot 19. The opposite end of the control wire 21 is passed through a guide 24 in the head-lamp casing, and it is attached to a control lever (not shown) of approved type located on the dashboard or steering column, or other portion of the vehicle convenient of access to the driver.

A coiled spring 25 bears against the end of the arm 18 and the bracket 9, and it surrounds the end of the "Bowden" control wire 21, serving to maintain the holder 10 in the position shown in Figure 1.

When the head-lamp is being used for normal lighting conditions and not required to be dimmed, the globe 17 is in correct focus with the parabolic reflector 6, and the rays of light projected from the lamp, by reason of the true parabolic curvature of the said reflector 6, are deflected in practically parallel relationship to each other as is shown by the lines a in Figure 1. The beam of light thus produced is very highly concentrated, and it strikes the roadway at a considerable distance in advance of the vehicle.

When another vehicle travelling in the opposite direction is approaching, and it is desired to obviate the glare and dazzling effect of the head-lamps whereby interference will not be caused to the driver of the approaching vehicle, said control lever is actuated by the driver to cause the "Bowden" control wire 21 to exert a rearward pull upon the arm 18 and move the holder 10 in a pivotal manner around the point 11 at which it is attached to the bracket 9. This movement causes the spring 25 to be compressed and the globe 17 to move in an arcuate path, described from the point 11, to the position shown in Figure 2. While in this position the globe 17 is out of focus with the parabolic reflector 6, and angles of incidence at which the rays of light strike the parabolic reflector are changed, so that the rays are not now reflected in parallel relationship to each other. The rays of light which strike the central portion of the parabolic reflector 6 are deflected downwardly as is shown by the lines b in Figure 2, and they now strike the roadway at a distance in advance of the vehicle which is considerably shorter than when the globe 17 is in normal focus with the parabolic reflector. These rays illuminate the roadway in advance of the vehicle sufficiently to enable the driver to negotiate the roadway with safety and without necessitating that slowing-down that hitherto has been requisite.

Figure 2:
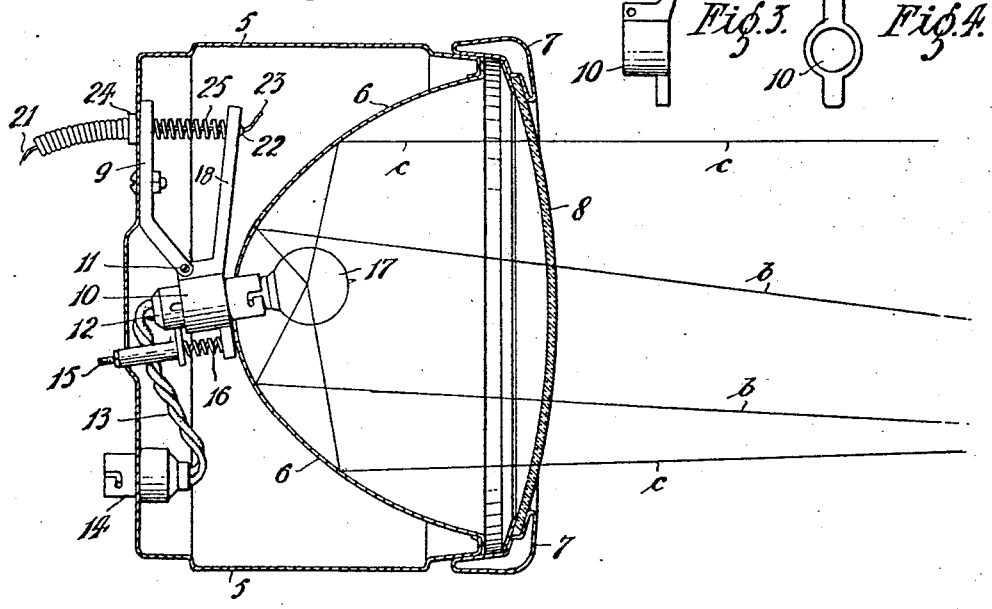
Figure 2 is a similar view showing the globe removed out of focus with the parabolic reflector for dimming.

The rays of light which strike the outer portions of the reflector 6 are diffused outwardly in all directions, as is shown by the lines c in Figure 2, and they do not produce any glare or dazzling effect. In some types of head-lamps, it may be desirable to frost or shade the lower portion of the parabolic reflector 6 to assist in the diffusion of the light rays striking this part of the reflector.

Upon the driver of the vehicle releasing the control lever, the tension of the spring 25 causes the holder 10 and the globe 17 to be returned automatically to their normal positions relative to the parabolic reflector 6, when the rays of light are again projected in parallel relationship as before described.

What I do claim is:—

1. A vehicle lamp, including a casing, a reflector therein, a bracket removably secured to the rear wall of the casing, a holder pivotally supported at the lower end of the bracket in rear of the reflector, an arm integral with and projecting upwardly from the holder, a control wire extending through the rear wall of the casing and removably connected to the upper end of the arm, and a spring encircling said wire and bearing between the arm and bracket.

2. A vehicle lamp, including a casing, a reflector therein, a bracket removably secured to the rear wall of the casing and having its lower end inclined outwardly from such rear wall, a cylindrical holder to slidably receive a lamp socket, an arm integral with the holder and extending at an upward forward inclination therefrom, means for pivotally connecting the rear end of the holder to the lower end of the bracket, an operating wire extending through the rear wall of the casing and removably engaged with the upper end of the arm, and a spring encircling the wire and bearing between the arm and bracket.

In testimony whereof I affix my signature in the presence of two witnesses.

CHARLES F. BROWNE.

Witnesses:
J. W. COTTON,
JAMES H. ANDERSON.